United States Patent
Yoo

(10) Patent No.: US 12,397,731 B2
(45) Date of Patent: Aug. 26, 2025

(54) SYSTEM FOR DETERMINING TYPE OF PASSENGER

(71) Applicants: Hyundai Motor Company, Seoul (KR); Kia Corporation, Seoul (KR)

(72) Inventor: Joo Seon Yoo, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 106 days.

(21) Appl. No.: 18/480,155

(22) Filed: Oct. 3, 2023

(65) Prior Publication Data
US 2024/0383431 A1 Nov. 21, 2024

(30) Foreign Application Priority Data

May 19, 2023 (KR) .................. 10-2023-0064823

(51) Int. Cl.
*B60R 21/015* (2006.01)
*B60N 2/00* (2006.01)

(52) U.S. Cl.
CPC ........ *B60R 21/0153* (2014.10); *B60N 2/0028* (2023.08); *B60N 2/0035* (2023.08); *B60R 21/01554* (2014.10); *B60R 21/01556* (2014.10); *B60N 2210/00* (2023.08); *B60N 2230/30* (2023.08)

(58) Field of Classification Search
CPC ............... B60N 2/0028; B60N 2/0035; B60N 2210/00; B60N 2230/30; B60R 21/01554; B60R 21/01556; B60R 21/01538; B60R 21/01512; B60R 2021/006; B60K 35/00; B60K 35/28; G60V 20/59; G60V 40/103
USPC ............................................. 701/45
See application file for complete search history.

(56) References Cited

U.S. PATENT DOCUMENTS

2022/0388429 A1* 12/2022 Noguchi .............. B60N 2/0273

FOREIGN PATENT DOCUMENTS

KR 10-2021-0070743 6/2021

* cited by examiner

*Primary Examiner* — Yi-Kai Wang
(74) *Attorney, Agent, or Firm* — Fish & Richardson P.C.

(57) ABSTRACT

A system capable of determining a type of a passenger sitting on a seat according to a body type is disclosed. The system includes a seat detecting means detecting a position of a seat and an angle of a seat back, a passenger detecting means detecting a passenger based on a state where a specific passenger normally sits on the seat, and a controller detecting a passenger's body part along with a seat-back area where the seat back is positioned and a passenger area where the passenger is positioned using information detected by the seat detecting means and the passenger detecting means, and learning a parameter value that is input as a relationship of detected information and a classification result for a body type of the passenger that is output by the parameter value, thus setting a body-type classification model.

19 Claims, 14 Drawing Sheets

SYSTEM FOR DETERMINING TYPE OF PASSENGER

CROSS REFERENCE TO RELATED APPLICATIONS

The present application claims priority to Korean Patent Application No. 10-2023-0064823, filed May 19, 2023, the entire contents of which is incorporated herein for all purposes by this reference.

TECHNICAL FIELD

The present disclosure relates to a passenger classification system that accurately identifies a type of a passenger based on body characteristics while seated.

BACKGROUND

A conventional passenger determining device includes a camera within a vehicle to capture passenger images. These images are then transmitted to an image controller, allowing differentiation between adult and child passengers by analyzing the transmitted image data.

Thus, the seat occupied by the child passenger sits is regulated to inhibit airbag deployment, even during accidents. This proactive measure fundamentally mitigates the potential risk of injury stemming from airbag deployment forces.

Further, when an adult passenger occupies a seat and their body size is 5% or more smaller than the standard adult dimensions, the seat is regulated to follow the Low Risk Deployment (LRD) regulations. This ensures that the airbag deploys with a reduced force, effectively deploying an airbag cushion with minimal risk and thus safeguarding the passenger from potential injuries.

However, the utilization of a camera for passenger imaging introduces a limitation that, where the passenger's body or a Child Restraint System (CRS) is obstructed by certain objects can result in in accurate photography, potentially causing misidentification of the passenger.

Moreover, due to the camera's inherent characteristics, the slight disparity in the threshold value used to differentiate between a child passenger on a booster and a small adult passenger is challenging to discern, making it intricate to accurately distinguish between the child passenger and the adult passenger.

SUMMARY

The present disclosure is directed to a passenger determining system that can clearly distinguish between an adult passenger and a child passenger sitting on a seat.

According to one aspect, a system for determining a type of a passenger includes a seat detector detecting a position of a seat and an angle of a seat back, a passenger detector detecting a passenger based on a state where a specific passenger normally sits on the seat, and a controller detecting a passenger's body part along with a seat-back area where the seat back is positioned and a passenger area where the passenger is positioned using information detected by the seat detector and the passenger detector, and learning a parameter value that is input as a relationship of detected information and a classification result for a body type of the passenger that is output by the parameter value, thus setting a body-type classification model.

The seat detector may be a seat position sensor, and may detect the seat-back area in a shape of a box by tracking the position of the seat back using the seat position sensor according to a movement of the seat. The passenger detector may be an image sensor photographing the passenger, and may detect the passenger area including a passenger's whole-body area and a passenger's face area photographed by the image sensor in a shape of a box.

The parameter value may include a length of a vertical torso line of the passenger, and a distance between an upper line of the whole-body area detecting the passenger's whole body and an upper line of the seat-back area.

The parameter value may include an angle formed between a horizontal shoulder line and a vertical torso line of the passenger, a distance between an upper line of the whole-body area detecting the passenger's whole body and an upper line of the seat-back area, a distance between an upper line of the face area detecting a passenger's face and the upper line of the seat-back area, a size and position of the seat-back area, and a minimum distance between a center of the horizontal shoulder line of the passenger and a side line of the seat-back area.

The controller may determine whether the passenger is sitting normally by the body-type classification model when an unspecified passenger is detected, and may control to induce self-correction for normal sitting, when the passenger is in an abnormal sitting state.

When the unspecified passenger is in the abnormal sitting state, a currently photographed image may be transmitted to an audio video navigation (AVN) system along with a warning message indicating that it is impossible to deploy the airbag.

When a CRS in the seat is not detected, a shoe area of the passenger is detected in a shape of a box, and the length of the shoulder line in the shoe area is equal to or more than a threshold value, the controller may determine it as the abnormal sitting state.

When it is determined that the sitting state is abnormal, the length of the shoulder line in the shoe area may be corrected to be smaller than a length shown in an actual image, and a corrected state may be maintained until the passenger's posture is changed to a normal sitting state.

When the shoulder line of the passenger is higher than the upper line of the seat-back area and the length of the shoulder line is less than the threshold value, the controller may determine it as the abnormal sitting state.

When it is determined that the sitting state is abnormal, the length of the shoulder line of the passenger and the size of the seat-back area may be corrected to be smaller than a size shown in an actual image, and a corrected state may be maintained until the passenger's posture is changed to a normal sitting state.

When the shoulder line of the passenger is higher than the upper line of the seat-back area and the length of the shoulder line is equal to or more than the threshold value, the controller determines it as the normal sitting state.

The controller may determine that the passenger is in the abnormal sitting state when a center line of the seat-back area is higher than the upper line of the face area detecting the passenger's face.

When it is determined that the sitting state is abnormal, the seat-back area and the face area are corrected to be larger than a size shown in an actual image, and a corrected state is maintained until the passenger's posture is changed to a normal sitting state.

The controller may determine that the passenger is in the abnormal sitting state when a distance between the vertical torso line of the passenger and the side line of the seat-back area is less than a threshold vehicle.

When it is determined that the sitting state is abnormal, the distance between the torso line of the passenger and the side line of the seat-back area may be corrected to be smaller than a distance shown in an actual image, and a corrected state may be maintained until the passenger's posture is changed to a normal sitting state.

When a blanket is detected by the image sensor, the controller may detect an object around the blanket to determine whether the passenger is sitting and determine the type of the passenger.

When the CRS is detected together with the blanket, it may be determined that a relatively small-sized passenger sits.

When the blanket is detected, a function of detecting the size of the passenger's body part may be deactivated.

When the passenger's face is detected together with the blanket and the upper line of the seat-back area is higher than the upper line of the face area detecting the passenger's face, it may be determined that a relatively small-sized passenger sits.

When only the blanket is detected, it may be determined that the passenger does not sit, and a photographed image may be transmitted to the AVN system along with a warning message indicating that it is impossible to deploy the airbag.

The present disclosure is advantageous in that it can more clearly classify adult, child, and infant passengers by learning various postures in which the passengers sit and then determining types of passengers according to their body types using a learned body-type classification model.

Moreover, the present disclosure is advantageous in that it checks whether a passenger is sitting normally, the distortion of the passenger's body size occurring when the passenger is not sitting normally is compensated for, thus reducing the risk of injury to the passenger due to the malfunction of an airbag, and causing the passenger who does not sit normally to change to a correct posture, thereby reducing the risk of injury to the passenger.

In addition, the present disclosure is advantageous in that passengers are classified according to scenarios for each situation when a blanket is detected, a legal test mode (CRS) is satisfied with an optimal resource through a blanket surrounding detection mode, and the risk of injury to a passenger is reduced by inducing the passenger to perform self-correction when it is impossible to detect the passenger due to the incorrect use of the blanket.

DETAILED DESCRIPTION

A system for determining a type of a passenger according to the present disclosure includes a seat detector detecting a position a of a seat and an angle b of a seat back, a passenger detector detecting a passenger based on a state where a specific passenger normally sits on the seat, and a controller 300 detecting a passenger's body part along with a seat-back area A1 where the seat back is positioned and a passenger area where the passenger is positioned using information detected by the seat detector and the passenger detector, and learning a parameter value that is input as a relationship of detected information and a classification result for a body type of the passenger that is output by the parameter value, thus setting a body-type classification model 330.

Here, the seat detector may be a seat position sensor 100, and may detect the seat-back area A1 in a shape of a box by tracking the position of the seat back using the seat position sensor 100 according to a movement of the seat, and the passenger detector may be an image sensor 200 photographing the passenger, and detects the passenger area including a passenger's whole-body area A2 and a passenger's face area A3 photographed by the image sensor 200 in a shape of a box.

Figure 1:
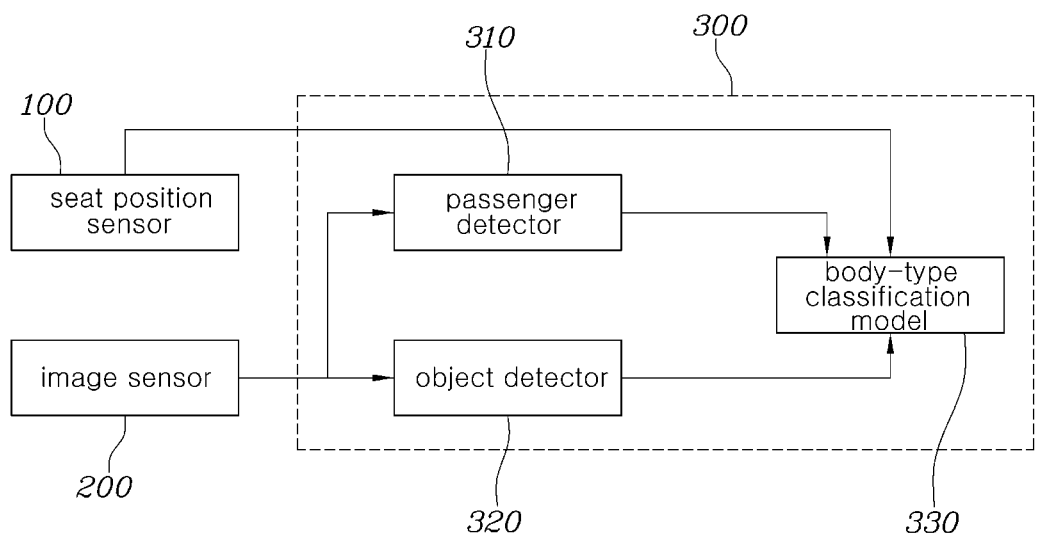
FIG. 1 is a block diagram schematically showing an example of a passenger recognition system.
Figure 2:
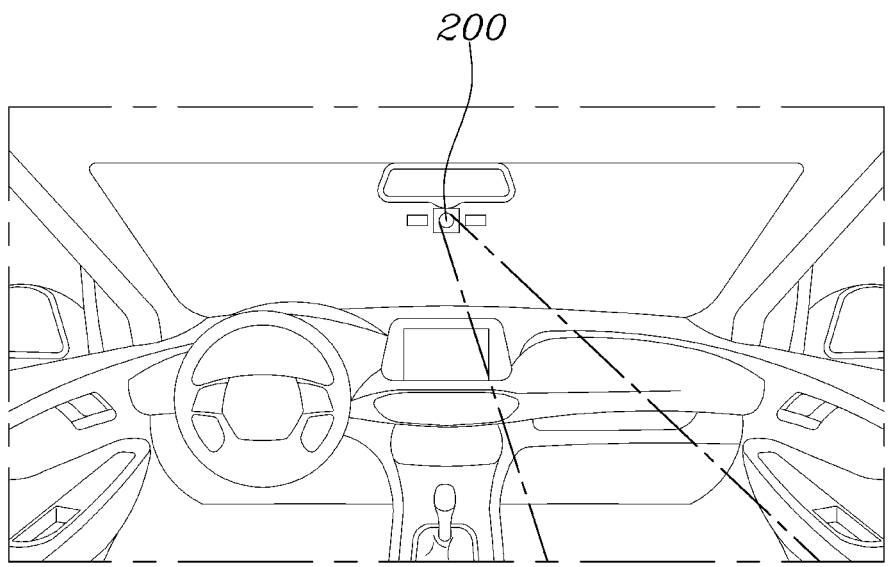
FIG. 2 is a diagram illustrating a state in which an example of an image sensor is installed.
Figure 3:
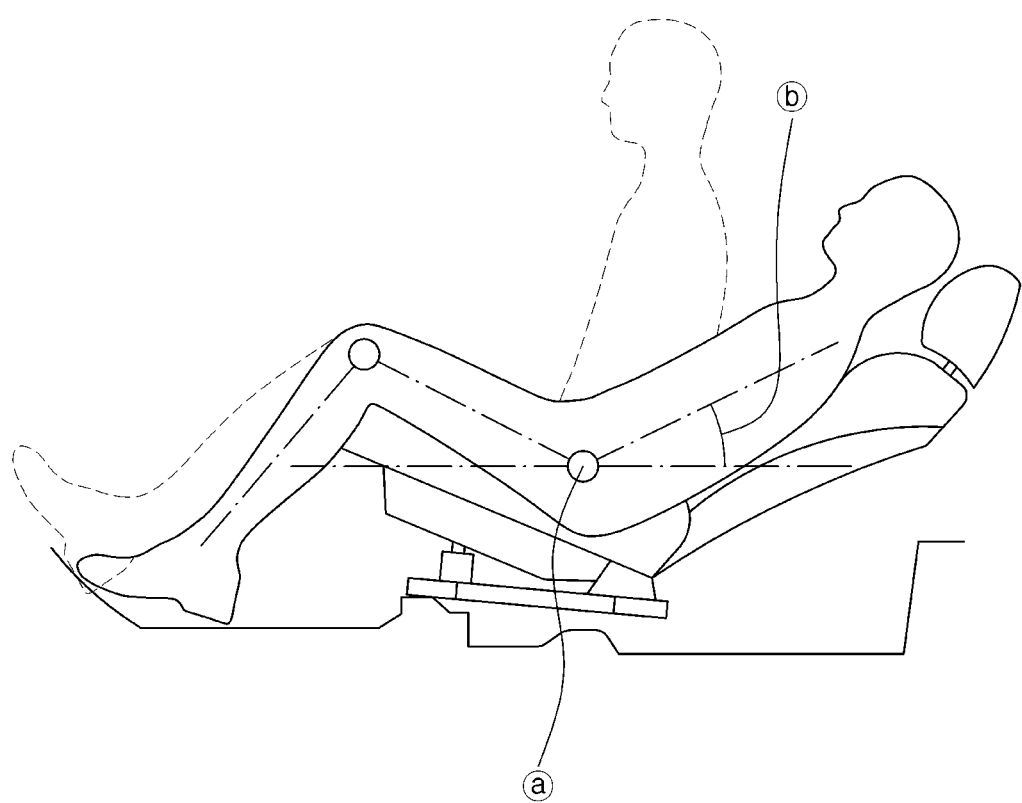
FIG. 3 is a diagram illustrating an example of a seat position and a seat back angle acquired by a seat position sensor.
Figure 4:
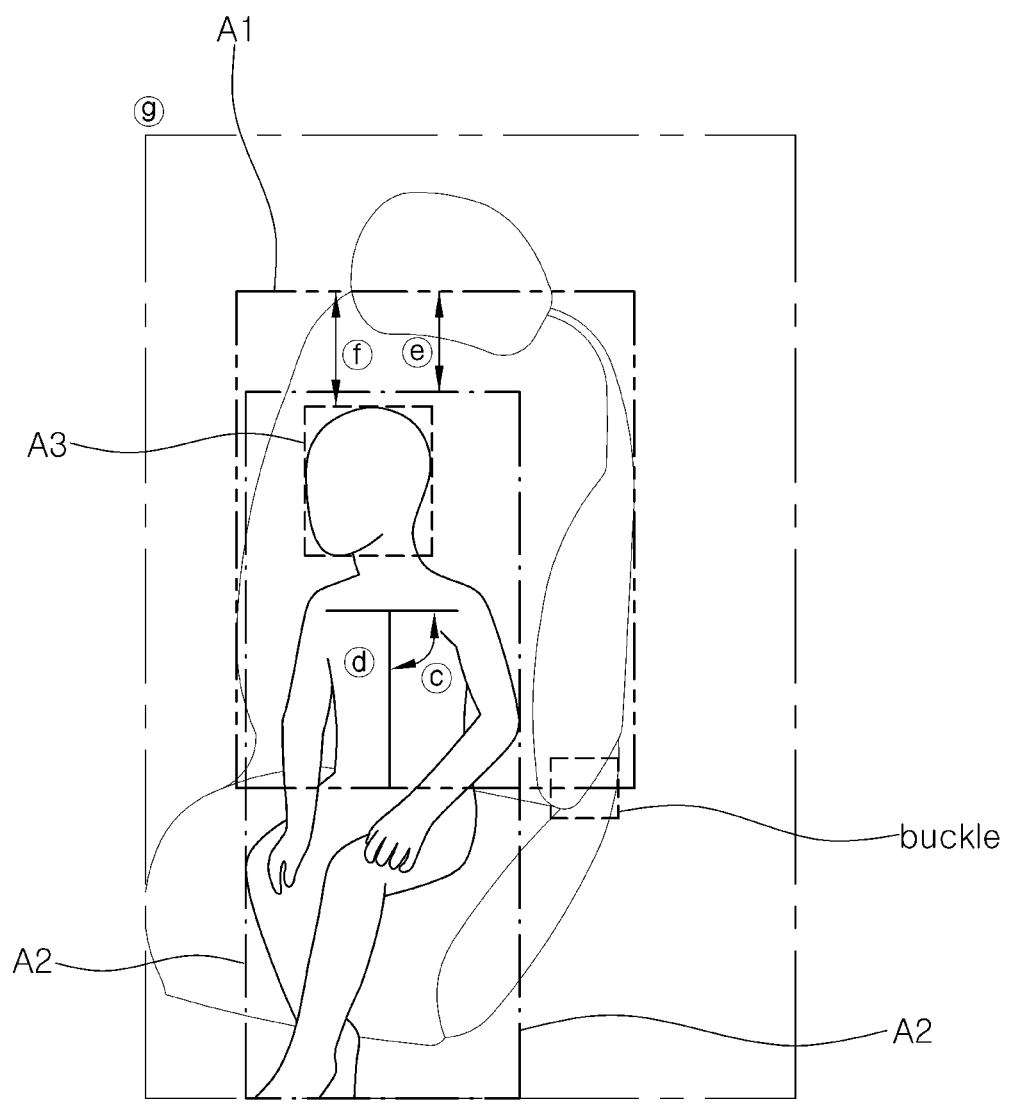
FIG. 4 is a diagram illustrating an example of an image in which seat information and passenger information are detected in a state where a seat is positioned in front.

Main components of the passenger recognition system according to the present disclosure will be described with reference to FIGS. 1 to 3. The seat position sensor 100 may acquire information about a position a of the seat and an angle b of the seat back. The position a of the seat may be a criterion for the sliding of the seat, the height of the seat, and a point at which the tilting action of the seat may be reflected.

The image sensor 200 may be a 2D camera-type vision sensor that detects IR (infrared rays) and RGB (color), and is installed in a vehicle to detect a passenger sitting on the seat.

The controller 300 may be an integrated image controller that detects the position of the seat back using information acquired by the seat position sensor 100, detects a passenger's body part on the basis of an image detected by the image sensor 200, and classifies and detects objects.

To be more specific, the controller 300 includes a passenger detector 310 that detects the size of the passenger's body part as well as the body shape and body part of the passenger through an AI-based image recognition algorithm, and an object detector 320 that individually detects an object shown in the image.

Here, the passenger detector 310 may detect the passenger's body part and estimate the body size using Skeleton-based body key point technology, but other algorithms that may detect the passenger's body part and estimate the body size may be used.

As long as the object detector 320 is a detector capable of detecting an object, it may be applied to the present disclosure regardless of how it detects and learns the object.

On the other hand, when a passenger is detected in a designated area photographed by the image sensor 200, the body size of the passenger may be estimated using the passenger detector 310 and the object detector 320.

However, if the position a of the seat is changed by sliding, height adjustment, or tilting movement of the seat, such a change causes an image distortion phenomenon in which the body size of the passenger shown in the image changes, so an adult passenger and a child passenger may be misrecognized.

Thus, as shown in FIGS. 4 to 7, according to the present disclosure, seat position information and body part information of the passenger are detected on the basis of the normal sitting state of a specific passenger (or dummy) according to various changes in the position of the seat, a classification result for the body type of the passenger is previously learned using the detected information, and a learned body-type classification model 330 is stored in the controller 300.

At this time, specific passengers may be classified into regular adult passengers, adult passengers whose body size is smaller than that of a regular adult by 5% or more, and passengers with body types representing child passengers and infant passengers.

As such, when a passenger gets into the vehicle in a state where the model in which the body type of the passenger has been learned is stored in the controller 300, the position of the seat back and the body information of the passenger are detected using the passenger detector 310 and the object detector 320.

Thus, when data on the body type of the passenger on the basis of the detected information is detected and input, the result of determining the body type of the passenger is output using the modeled body-type classification model 330, so it is possible to more precisely estimate and determine the age of the passenger.

Figure 5:
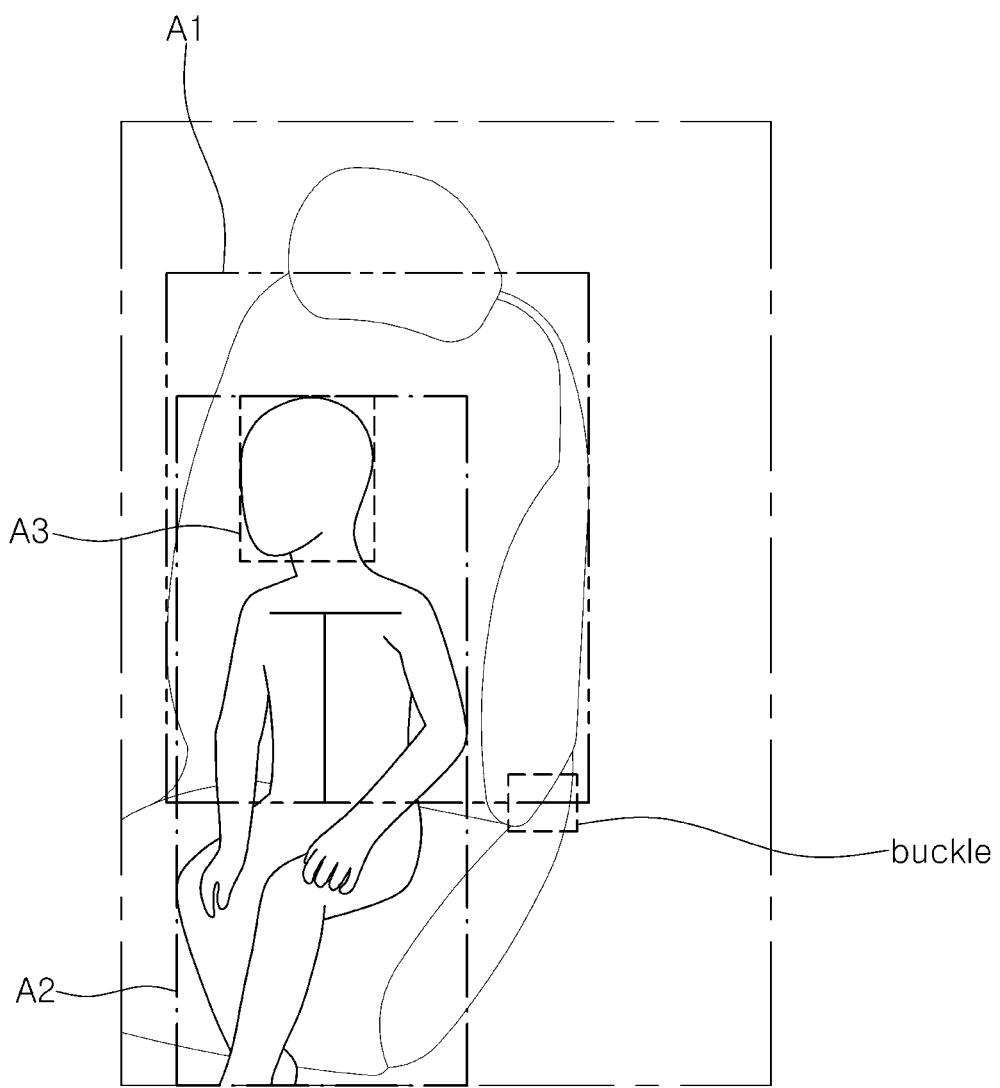
FIG. 5 is a diagram illustrating an example of an image in which seat information and passenger information are detected in a state where a seat is positioned in the middle.
Figure 6:
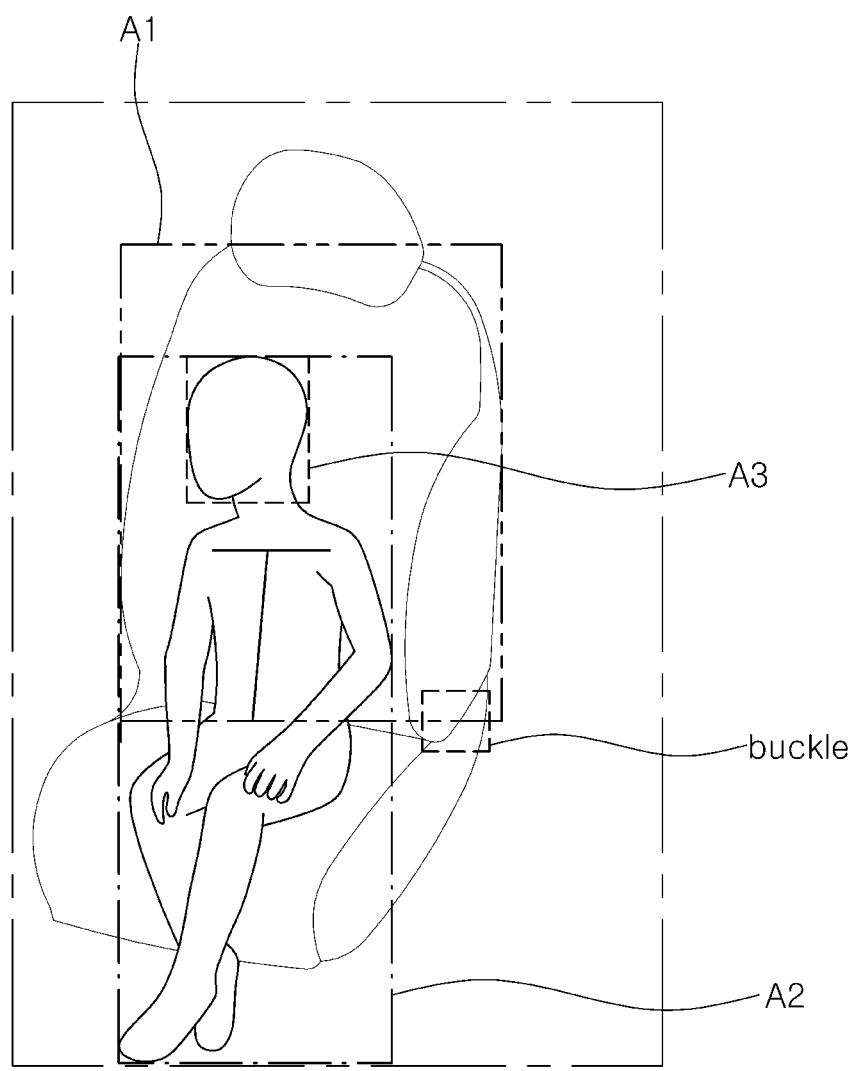
FIG. 6 is a diagram illustrating an example of an image in which seat back information and passenger information are detected in a state where a seat is positioned in the rear.
Figure 7:
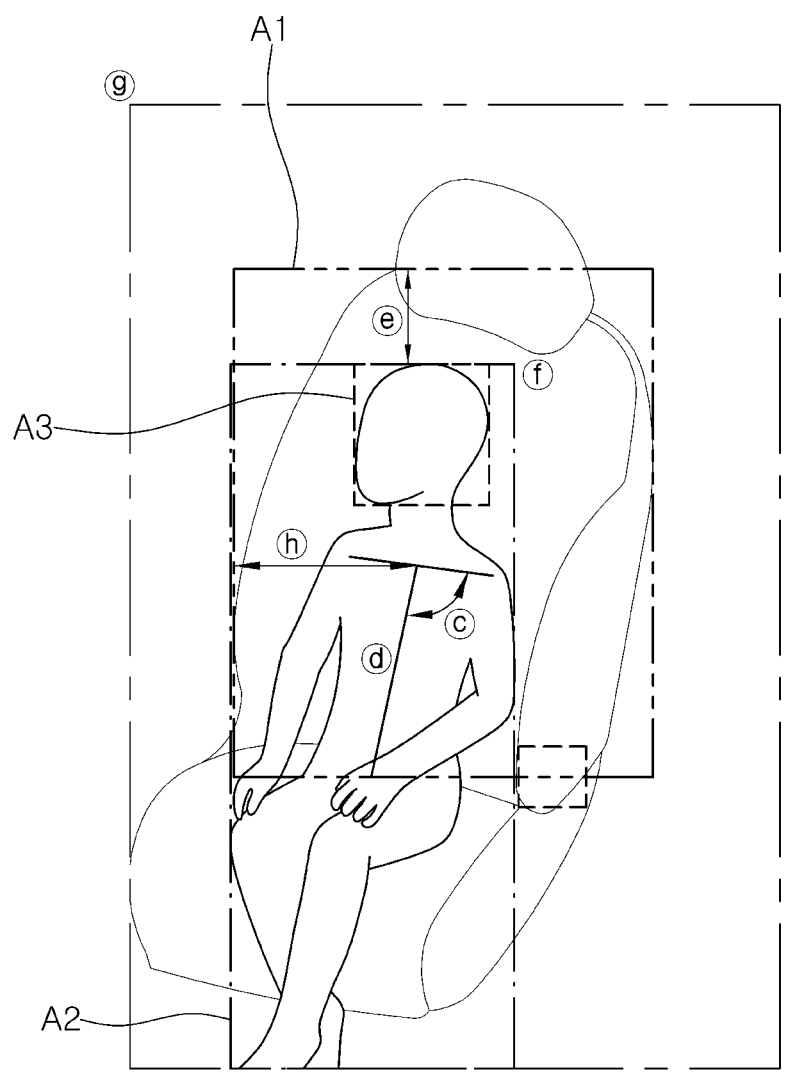
FIG. 7 is a diagram illustrating an example of an image in which seat information and passenger information are detected in a state in which a seat back is reclined backward.

As shown in FIGS. 5 and 7, according to the present disclosure, parameter values that are input into the controller 300 may be a length d of a passenger's torso line, and a distance e between an upper line of a whole body area A2 detecting the passenger's whole body and an upper line of a seat back area A1.

Referring to the drawings, the seat back area A1 is detected using information acquired by the seat position sensor 100.

Further, from the image captured by the image sensor 200, the object detector 320 detects the outline of the passenger's whole body in the form of a rectangular box, and detects the outline of the passenger's face in the form of a rectangular box.

Further, the passenger detector 310 detects a length d from a passenger's shoulder line to a torso line.

That is, the parameter value data is measured and learned using a value measured through the image and information acquired by the seat position sensor 100. Therefore, when the passenger is detected, the type of the passenger may be determined on the basis of the corresponding parameter value data.

In addition, the parameter values input into the controller 300 may be an angle c between a horizontal shoulder line and a vertical torso line of a passenger, a distance e between an upper line of a whole-body area A2 detecting the whole body of a passenger and an upper line of a seat-back area A1, a distance f between an upper line of a face area A3 detecting a passenger's face and an upper line of the seat-back area A1, a size and position g of the seat-back area A1, and a minimum distance h between a center of the horizontal shoulder line of the passenger and a side line of the seat-back area A1.

For example, when an object covers the passenger's torso and distortion occurs in the measurement of the passenger's torso length, the parameter value data is measured and learned using the value measured through the image and the information obtained from the seat position sensor 100. Therefore, when a passenger is detected, the type of the passenger may be determined using the corresponding parameter value data.

On the other hand, according to the present disclosure, the controller 300 may determine whether the passenger is sitting normally by the body-type classification model 330 when an unspecified passenger is detected, and may control to induce self-correction for normal sitting, when the passenger is in the abnormal sitting state.

That is, when the passenger is detected in a designated area, it is checked whether the passenger is sitting normally. When the passenger is not in the normal sitting state, a warning or message for inducing the passenger to sit normally may be generated.

As a preferred example, when an unspecified passenger is in the abnormal sitting state, a currently photographed image may be transmitted to an AVN system along with a warning message indicating that the airbag may not be deployed.

That is, the warning message such as 'Please sit in a correct posture. The airbag of the passenger seat is not deployed.' along with the image of the passenger sitting in the abnormal sitting state are transmitted to the AVN system in the vehicle, thereby inducing the passenger to sit normally.

In addition, when the CRS in the seat is not detected, the controller 300 may detect a shoe area A4 of the passenger in a box shape. When the length of the shoulder line in the shoe area A4 is equal to or more than a threshold value, it may be determined as the abnormal sitting state.

Figure 8:
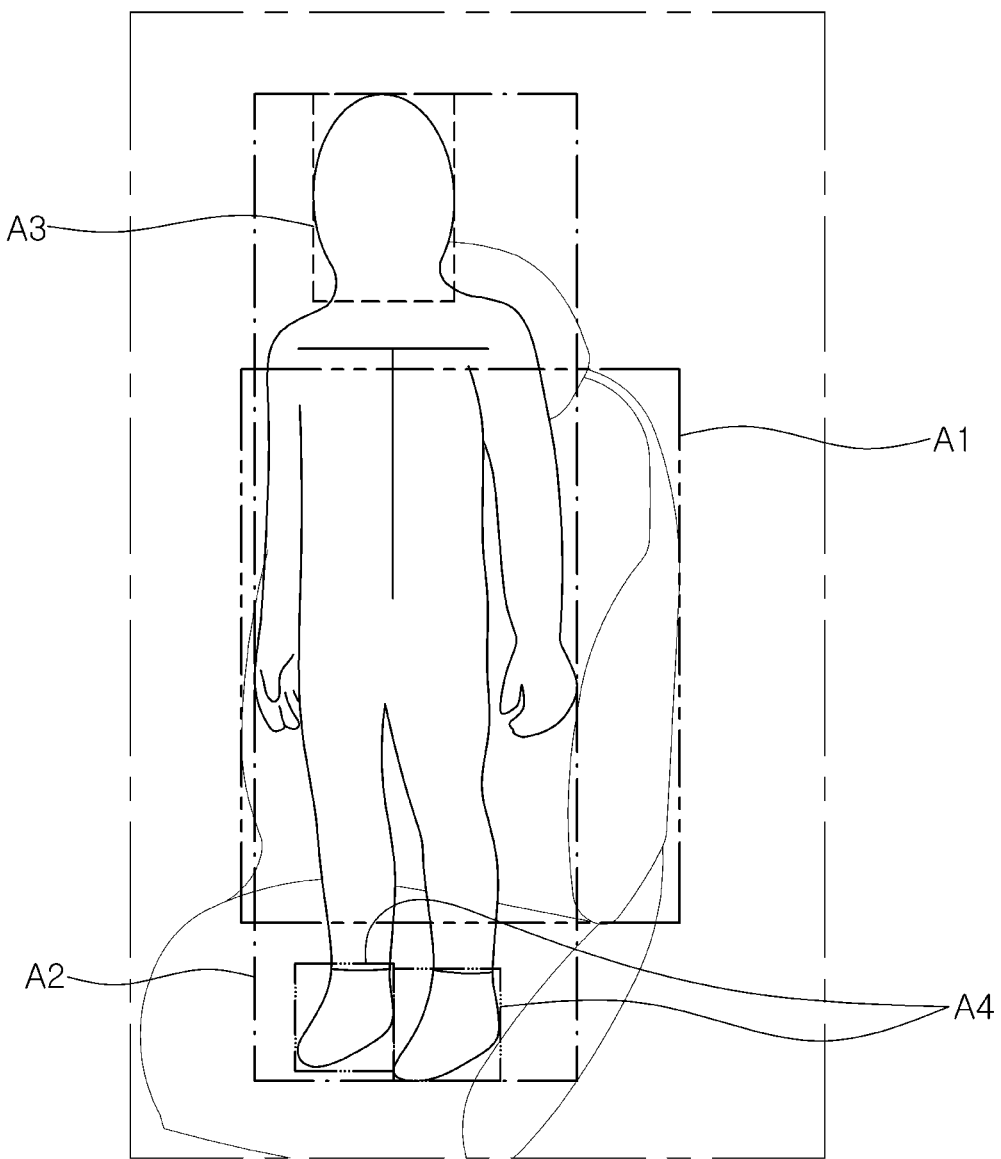
FIG. 8 is a diagram illustrating an example of an image in which seat information and passenger information are detected in an abnormal sitting state in which a child passenger is standing on a seat.

For example, referring to FIG. 8, when it is determined that the passenger sitting on the seat is a small 3-year-old child passenger, it may be estimated that the child passenger is standing on the seat if the length between the shoe of the child passenger and the shoulder line is equal to or greater than a set threshold value. This is determined as the abnormal sitting state.

As such, when it is determined that the sitting state is abnormal, the length of the shoulder line in the shoe area A4 may be corrected to be smaller than a length shown in an actual image, and a corrected state may be maintained until the passenger's posture is changed to a normal sitting state.

For example, when the child passenger is sitting on the seat in the abnormal sitting state, the body size of the child passenger detected in the image may be detected as large due to the change in posture of the child passenger. As a result, the body size of the child passenger may be distorted to the body size of the adult passenger, so the child passenger may be mistakenly recognized as the adult passenger.

In the event of an accident in a state where the child passenger is misrecognized as the adult passenger, the airbag cushion is deployed based on the characteristics of the adult passenger rather than using a LRD mode. This increases the risk of injury to the child passenger.

Therefore, the body size of the child passenger detected in the image is kept small until it is determined that the child passenger is in the normal sitting state, thus preventing the risk of injury to the passenger when the airbag is deployed.

In addition, when the shoulder line of the passenger is higher than the upper line of the seat-back area A1 and the length of the shoulder line is less than the threshold value, this may be determined as the abnormal sitting state by the controller 300.

For example, referring to FIG. 8, when it is determined that the passenger sitting on the seat is a small 3-year-old child passenger, it may be estimated that the child passenger is standing on the front of the seat if the height of the child passenger's shoulder line is higher than the upper line of the seat-back area A1 and the length of the shoulder line is less than a set threshold value. This is determined as the abnormal sitting state.

As such, when it is determined that the sitting state is abnormal, the length of the shoulder line of the passenger and the size of the seat-back area A1 may be corrected to be smaller than a length shown in an actual image, and a corrected state may be maintained until the passenger's posture is changed to a normal sitting state.

For example, when the child passenger is sitting on the seat in the abnormal sitting state, the body size of the child passenger detected in the image may be detected as large due to the change in posture of the child passenger. As a result, the body size of the child passenger may be distorted to the body size of the adult passenger, so the child passenger may be mistakenly recognized as the adult passenger.

In the event of an accident in a state where the child passenger is misrecognized as the adult passenger, the airbag cushion is deployed based on the characteristics of the adult passenger rather than using a LRD mode. This increases the risk of injury to the child passenger.

Therefore, the body size of the child passenger detected in the image is kept small until it is determined that the child passenger is in the normal sitting state, thus preventing the risk of injury to the passenger when the airbag is deployed.

However, the controller 300 may determine that the passenger is in the normal sitting state when the shoulder line of the corresponding passenger is higher than the upper line of the seat-back area A1 and the length of the shoulder line is equal to or greater than a threshold value.

That is, as shown in FIG. 8, when the height of the passenger's shoulder line is higher than the upper line of the seat-back area A1 and the length of the shoulder line is less than a preset threshold value, it is determined that the passenger is a child passenger. In contrast, when the height of the passenger's shoulder line is higher than the upper line of the seat-back area A1 and the length of the shoulder line is equal to or more than the preset threshold value, it is determined that the passenger is an adult passenger.

Therefore, in this case, it is determined that the passenger is in the normal sitting state.

On the other hand, according to the present disclosure, controller 300 may determine that the passenger is in the abnormal sitting state when a center line of the seat-back area A1 is higher than the upper line of the face area A3 detecting the passenger's face.

Figure 9:
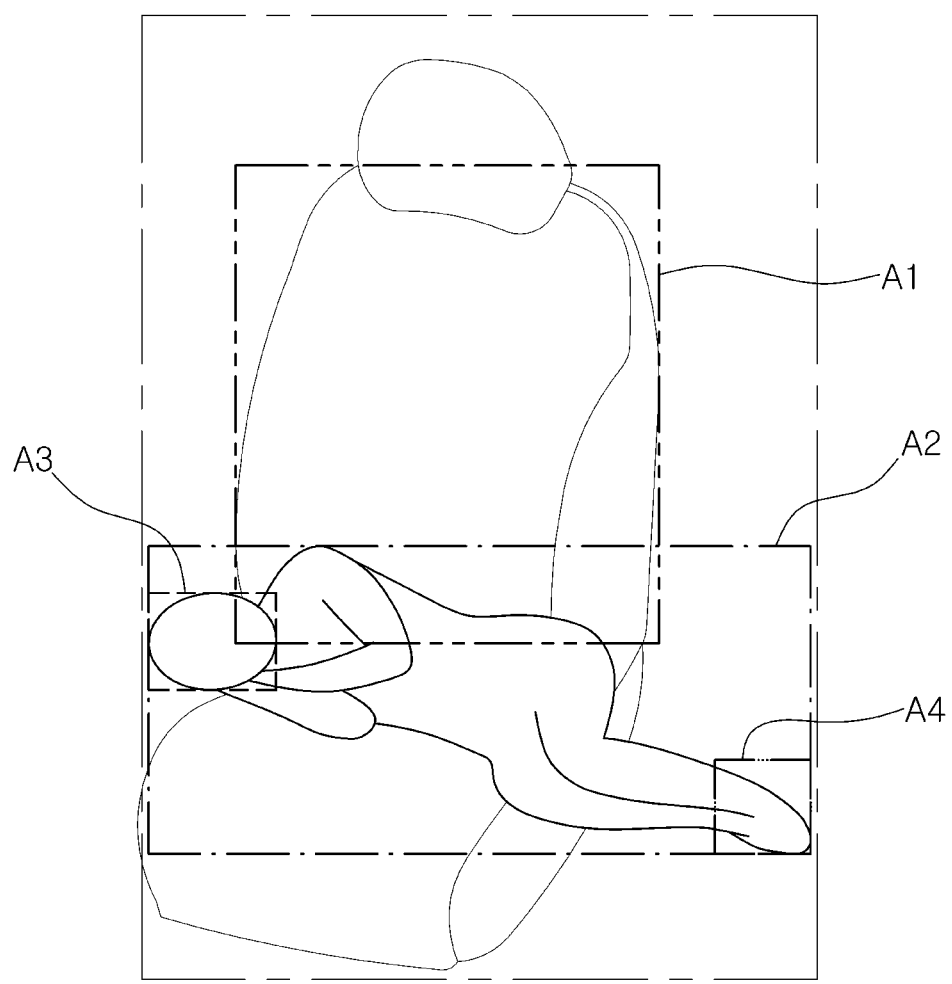
FIG. 9 is a diagram illustrating an example of an image in which seat information and passenger information are detected in an abnormal sitting state in which a child passenger is lying on a seat.

For example, referring to FIG. 9, when it is determined that the passenger sitting on the seat is a small 3-year-old child passenger, it may be estimated that the child passenger is lying on the seat if the height of the center line of the seat-back area A1 is higher than the upper end of the face area A3 of the child passenger. This is determined as the abnormal sitting state.

As such, when it is determined that the sitting state is abnormal, the seat-back area A1 and the face area A3 may be corrected to be larger than a size shown in an actual image, and a corrected state may be maintained until the passenger's posture is changed to a normal sitting state.

For example, when the child passenger is sitting on the seat in the abnormal sitting state, the body size of the child passenger detected in the image may be detected as small due to the change in posture of the child passenger. As a result, the body size of the child passenger may be distorted to the body size of the infant passenger, so the child passenger may be mistakenly recognized as the infant passenger.

In the event of an accident in a state where the child passenger is misrecognized as the infant passenger, the airbag cushion is not deployed. This increases the risk of injury to the child passenger.

Therefore, the body size of the child passenger detected in the image is kept large until it is determined that the child passenger is in the normal sitting state, thus preventing the risk of injury to the passenger when the airbag is deployed.

Further, the controller 300 may determine that the passenger is in the abnormal sitting state when a distance between the vertical torso line of the passenger and the side line of the seat-back area A1 is less than a threshold vehicle.

Figure 10:
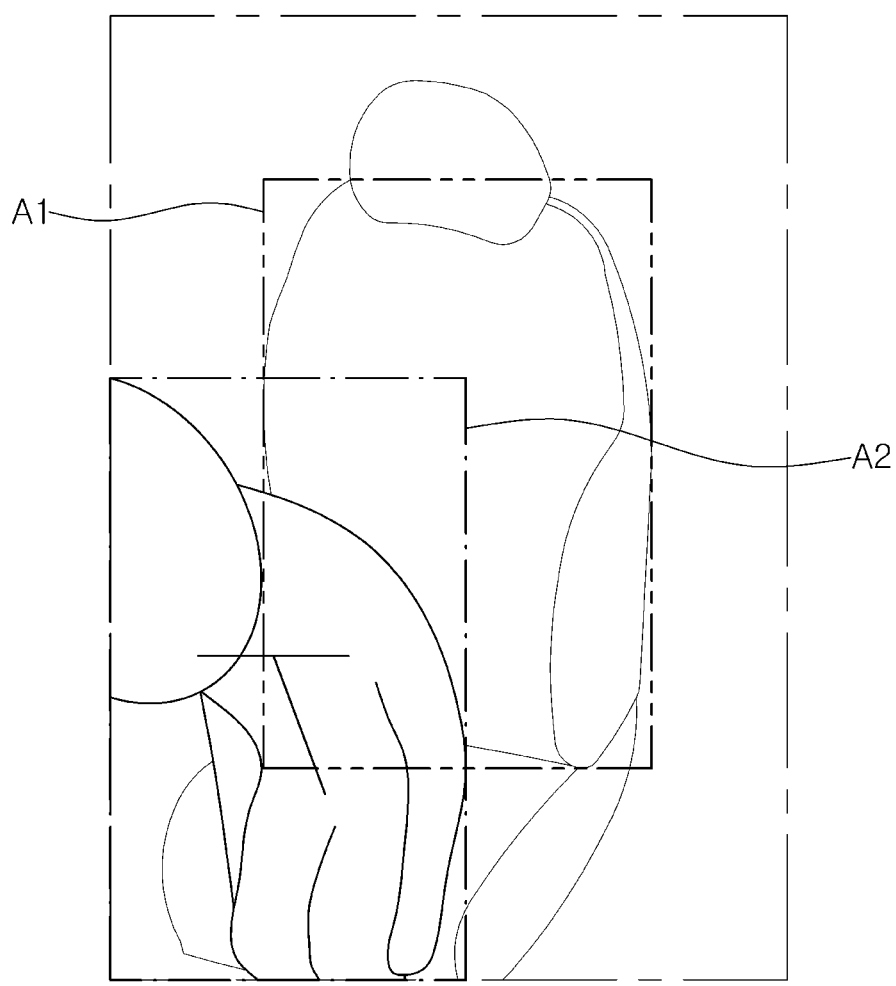
FIG. 10 is a diagram illustrating an example of an image in which seat information and passenger information are detected in an abnormal seating state in which a child passenger is leaning forward on a seat.
Figure 11:
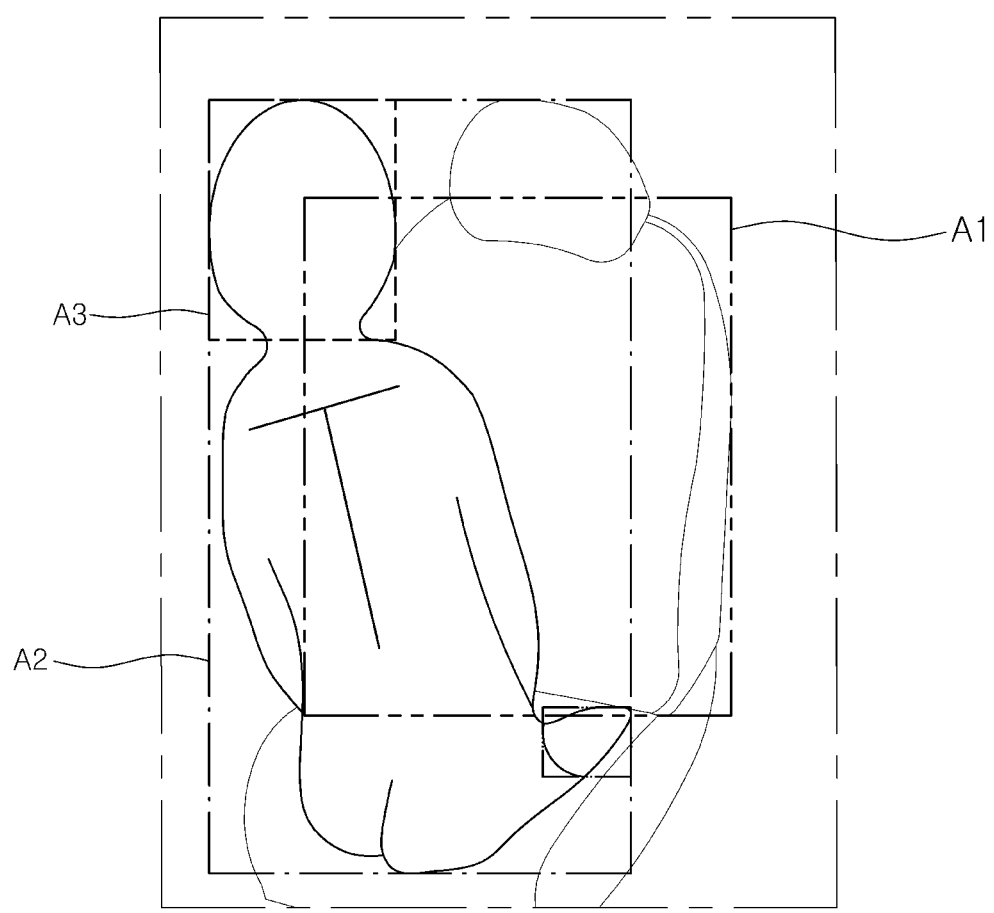
FIG. 11 is a diagram illustrating an example of an image in which seat information and passenger information are detected in an abnormal seating state in which a child passenger is kneeling on a front of a seat.

For example, referring to FIGS. 10 and 11, when the distance between the vertical torso line of the passenger and the left or right line of the seat-back area A1 is less than a preset threshold vehicle, it may be estimated that the passenger is leaning forward or the upper body of the passenger is positioned forward. This is determined as the abnormal sitting state.

As such, when it is determined that the sitting state is abnormal, the distance between the torso line of the passenger and the side line of the seat-back area A1 may be corrected to be smaller than a distance shown in an actual image, and a corrected state may be maintained until the passenger's posture is changed to a normal sitting state.

For example, when the child passenger is sitting on the seat in the abnormal sitting state, the body size of the child passenger detected in the image may be detected as large due to the change in posture of the child passenger. As a result, the body size of the child passenger may be distorted to the body size of the adult passenger, so the child passenger may be mistakenly recognized as the adult passenger.

In the event of an accident in a state where the child passenger is misrecognized as the adult passenger, the airbag cushion is deployed based on the characteristics of the adult passenger rather than using the LRD mode. This increases the risk of injury to the child passenger.

Therefore, the body size of the child passenger detected in the image is kept small until it is determined that the child passenger is in the normal sitting state, thus preventing the risk of injury to the passenger when the airbag is deployed.

On the other hand, according to the present disclosure, when the blanket A5 is detected by the image sensor 200, the controller 300 may detect an object around the blanket A5 to determine whether a passenger is sitting and determine a type of the passenger.

That is, when the blanket is detected in a box shape by the object detector 320 in the designated area, it is determined whether the passenger sits. When the passenger sits, the type of the passenger is determined according to the body type.

At this time, by operating in a mode of detecting only an adjacent object around the blanket A5, hardware resources are saved.

As a preferred example, when the CRS (child restraint system) A6 is detected together with the blanket A5, it may be determined that a relatively small-sized passenger sits.

Figure 12:
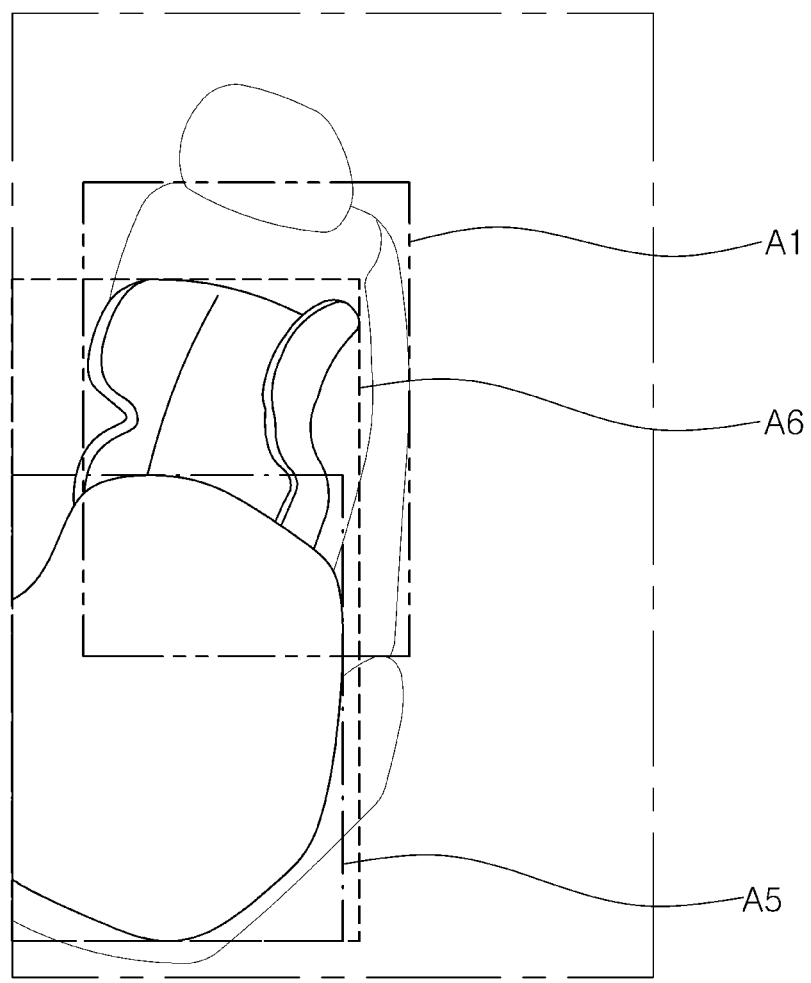
FIG. 12 is a diagram illustrating an example of an image in which a CRS is detected along with a blanket.

For example, as shown in FIG. 12, when a car seat is detected in the shape of a box around the blanket A5, the passenger of the seat may be determined to be a 1-year-old infant passenger. For reference, when it is determined that the passenger is a 1-year-old infant passenger, control may be performed such that the airbag is not deployed in the corresponding seat.

In addition, when the blanket A5 is detected, the function of detecting the size of the passenger's body part is deactivated.

That is, when the blanket A5 is detected, the body of the passenger may be covered by the blanket A5, so the passenger may be misrecognized.

Therefore, the function of measuring the passenger's body size by a body key point is deactivated.

Further, when the passenger's face is detected together with the blanket A5 and the upper line of the seat-back area A1 is higher than the upper line of the face area A3 detecting the passenger's face, it may be determined that a relatively small-sized passenger sits.

Figure 13:
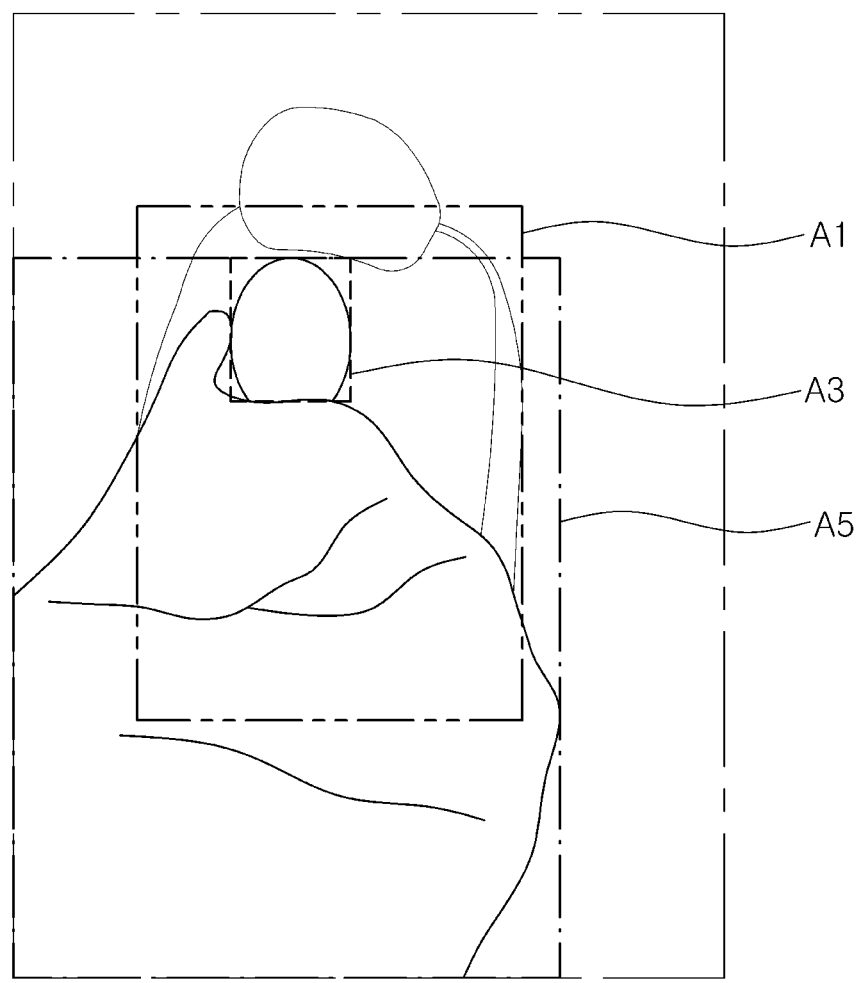
FIG. 13 is a diagram illustrating an example of an image in which a passenger's face is detected along with a blanket.

For example, as shown in FIG. 13, when both the blanket A5 and the passenger's face are detected, it is determined that the passenger sitting on the seat is a 3-year-old child passenger if the upper line of the seat-back area A1 is higher in height than the upper line of the face area A3.

Figure 14:
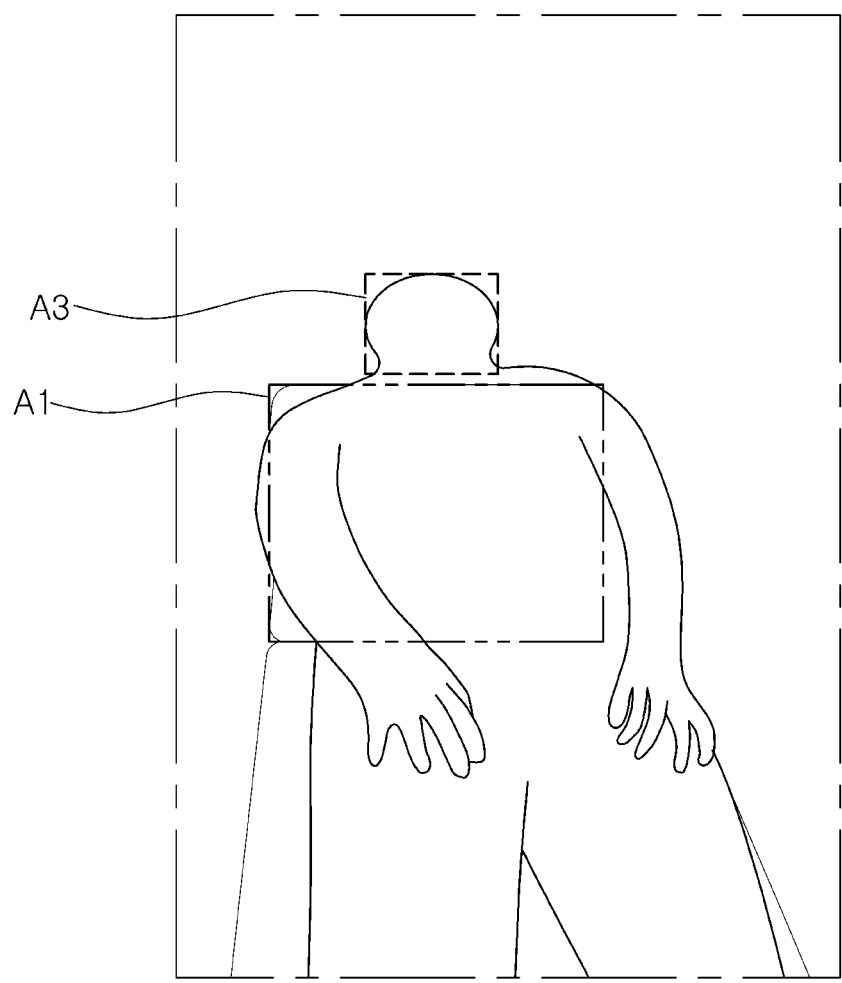
FIG. 14 is a diagram illustrating an example of an image in which a seat back and a face are detected in a state where an adult passenger is fully reclined.

This is because the upper line of the seat-back area A1 is higher in height than the upper line of the face area A3 even if the adult passenger is fully reclined as shown in FIG. 14. When the upper line of the seat-back area A1 is higher in height than the upper line of the face area A3, it is determined that the passenger is a child passenger.

In addition, when only the blanket A5 is detected, it is determined that the passenger does not sit, and the captured image may be transmitted to the AVN system along with the warning message indicating that the airbag may not be deployed.

Figure 15:
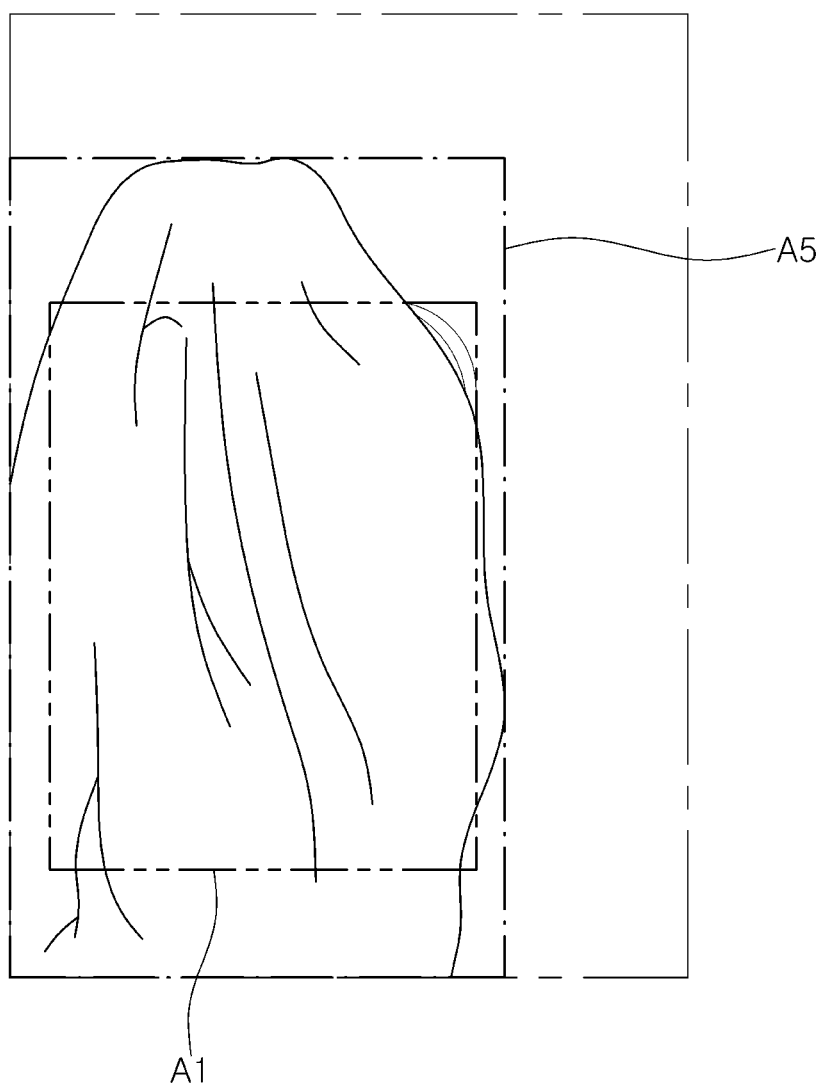
FIG. 15 is a diagram illustrating an example of an image in which only a blanket is detected.

That is, as shown in FIG. 15, when only the blanket A5 is detected and a surrounding object is not detected, the blanket A5 is recognized as the object and the airbag is not deployed.

Thus, the warning message such as 'Please do not completely cover with blanket. The passenger airbag is not deployed.' along with an image showing that the passenger is covered with the blanket are transmitted to the AVN system in the vehicle.

Therefore, when the passenger is completely covered with the blanket, control is performed such that the passenger's face may be seen and the airbag may be deployed in a dangerous situation.

As described above, the present disclosure provides a system for determining a type of a passenger, which can more clearly classify adult, child, and infant passengers by learning various postures in which the passengers sit and then determining types of passengers according to their body types using a learned body-type classification model 330.

Further, the present disclosure provides a system for determining a type of a passenger, in which it checks whether a passenger is sitting normally, the distortion of the passenger's body size occurring when the passenger is not sitting normally is compensated for, thus reducing the risk of injury to the passenger due to the malfunction of an airbag, and causing the passenger who does not sit normally to change to a correct posture, thereby reducing the risk of injury to the passenger.

In addition, the present disclosure provides a system for determining a type of a passenger, in which passengers are classified according to scenarios for each situation when a blanket A5 is detected, a CRS legal test mode is satisfied with an optimal resource through a blanket surrounding detection mode, and the risk of injury to a passenger is reduced by inducing the passenger to perform self-correction when it is impossible to detect the passenger due to the incorrect use of the blanket.

The invention claimed is:

1. A system for determining a type of a passenger, the system comprising:
   a seat detector configured to detect a position of a seat and an angle of a seat back;
   a passenger detector configured to detect a passenger based on a first seating location of a specific passenger; and
   a controller configured to:
      detect, based on information detected by the seat detector and the passenger detector, a body part of the passenger, a seat-back area where the seat back is positioned, and a passenger area where the passenger is positioned, and
      learn (i) a parameter value that is input as a relationship of detected information and (ii) a classification result for a body type of the passenger that is output by the parameter value, to thereby establish a body-type classification model,
   wherein the parameter value comprises:
      a length of a vertical torso line of the passenger, and
      a distance between an upper line of a whole-body area and an upper line of the seat-back area.

2. The system of claim 1, wherein the seat detector includes a seat position sensor and is configured to detect the seat-back area in a shape of a box by tracking the position of the seat back using the seat position sensor according to a movement of the seat, and
   wherein the passenger detector includes an image sensor configured to capture an image of the passenger and is configured to detect the passenger area including the whole-body area of the passenger and a face area of the passenger captured by the image sensor in a shape of a box.

3. A system for determining a type of a passenger, the system comprising:
   a seat detector configured to detect a position of a seat and an angle of a seat back;
   a passenger detector configured to detect a passenger based on a first seating location of a specific passenger; and
   a controller configured to:
      detect, based on information detected by the seat detector and the passenger detector, a body part of the passenger, a seat-back area where the seat back is positioned, and a passenger area where the passenger is positioned, and learn (i) a parameter value that is input as a relationship of detected information and (ii) a classification result for a body type of the passenger that is output by the parameter value, to thereby establish a body-type classification model, wherein the parameter value comprises:
an angle defined between a horizontal shoulder line and a vertical torso line of the passenger,
a distance between an upper line of a whole-body area and an upper line of the seat-back area,
a distance between an upper line of a face area and the upper line of the seat-back area,
a size and position of the seat-back area, and
a minimum distance between a center of the horizontal shoulder line of the passenger and a side line of the seat-back area.

4. A system for determining a type of a passenger, the system comprising:
a seat detector configured to detect a position of a seat and an angle of a seat back;
a passenger detector configured to detect a passenger based on a first seating location of a specific passenger; and
a controller configured to:
detect, based on information detected by the seat detector and the passenger detector, a body part of the passenger, a seat-back area where the seat back is positioned, and a passenger area where the passenger is positioned, and
learn (i) a parameter value that is input as a relationship of detected information and (ii) a classification result for a body type of the passenger that is output by the parameter value, to thereby establish a body-type classification model,
wherein the controller is configured to:
based on an unspecified passenger being detected, determine whether the passenger is seated at the first seating location using the body-type classification model, and
based on the passenger being in an abnormal sitting state, perform control to induce self-correction for normal sitting.

5. The system of claim 4, wherein, based on the unspecified passenger being in the abnormal sitting state, a currently photographed image is transmitted to an audio, video, navigation (AVN) system along with a warning message indicating that an airbag is not to be deployed.

6. The system of claim 4, wherein the controller is configured to, based on (i) a child restraint system (CRS) in the seat not being detected, (ii) a shoe area of the passenger being detected in a shape of a box, and (iii) a length of a shoulder line in the shoe area being equal to or more than a threshold value, determine that the passenger is in the abnormal sitting state.

7. The system of claim 6, wherein, based on a determination that the passenger in the abnormal sitting state, the length of the shoulder line in the shoe area is corrected to be less than a length shown in an actual image, and a corrected state is maintained until a posture of the passenger is changed to a normal sitting state.

8. The system of claim 4, wherein the controller is configured to, based on a shoulder line of the passenger being higher than an upper line of the seat-back area and a length of the shoulder line being less than a threshold value, determine that the passenger is in the abnormal sitting state.

9. The system of claim 8, wherein, based on a determination that the passenger is in the abnormal sitting state, the length of the shoulder line of the passenger and a size of the seat-back area are corrected to be less than a size shown in an actual image, and a corrected state is maintained until a posture of the passenger is changed to a normal sitting state.

10. The system of claim 4, wherein the controller is configured to, based on a shoulder line of the passenger being higher than an upper line of the seat-back area and a length of the shoulder line being equal to or more than a threshold value, determine that the passenger is in a normal sitting state.

11. The system of claim 4, wherein the controller is configured to, based on a center line of the seat-back area being higher than an upper line of a face area, determine that the passenger is in the abnormal sitting state.

12. The system of claim 11, wherein, based on a determination that the passenger is in the abnormal sitting state, the seat-back area and the face area are corrected to be larger than a size shown in an actual image, and a corrected state is maintained until a posture of the passenger is changed to a normal sitting state.

13. The system of claim 4, wherein the controller is configured to, based on a distance between a vertical torso line of the passenger and a side line of the seat-back area being less than a threshold vehicle, determine that the passenger is in the abnormal sitting state.

14. The system of claim 13, wherein, based on a determination that the passenger is in the abnormal sitting state, the distance between the vertical torso line of the passenger and the side line of the seat-back area is corrected to be less than a distance shown in an actual image, and a corrected state is maintained until a posture of the passenger is changed to a normal sitting state.

15. A system for determining a type of a passenger, the system comprising:
a seat detector configured to detect a position of a seat and an angle of a seat back;
a passenger detector configured to detect a passenger based on a first seating location of a specific passenger; and
a controller configured to:
detect, based on information detected by the seat detector and the passenger detector, a body part of the passenger, a seat-back area where the seat back is positioned, and a passenger area where the passenger is positioned, and
learn (i) a parameter value that is input as a relationship of detected information and (ii) a classification result for a body type of the passenger that is output by the parameter value, to thereby establish a body-type classification model,
wherein the controller is configured to, based on a blanket being detected by an image sensor, detect an object around the blanket to determine (i) whether the passenger is sitting and (ii) the type of the passenger.

16. The system of claim 15, wherein the controller is configured to, based on a CRS being detected with the blanket, determine that a size of a passenger is less than a predetermined size.

17. The system of claim 15, wherein, based on the blanket being detected, a function of detecting a size of the body part of the passenger is deactivated.

18. The system of claim 15, wherein the controller is configured to, based on a face of the passenger being detected with the blanket and an upper line of the seat-back area being higher than an upper line of a face area, determine that a size of a passenger is less than a predetermined size.

19. The system of claim 15, wherein the controller is configured to, based on only the blanket being detected, determine that the passenger does not sit, and a photographed image is transmitted to an AVN system along with a warning message indicating that an airbag is not to be deployed.

\* \* \* \* \*